(12) United States Patent
Okada

(10) Patent No.: US 8,807,811 B2
(45) Date of Patent: Aug. 19, 2014

(54) SEALING STRUCTURE FOR VEHICLE LIGHTING UNIT

(71) Applicant: Honda Motor Co., Ltd, Tokyo (JP)

(72) Inventor: Naoyuki Okada, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 74 days.

(21) Appl. No.: 13/758,314

(22) Filed: Feb. 4, 2013

(65) Prior Publication Data

US 2013/0229821 A1 Sep. 5, 2013

(30) Foreign Application Priority Data

Mar. 2, 2012 (JP) ................................. 2012-047331

(51) Int. Cl.
*F21V 31/00* (2006.01)
*B60Q 1/02* (2006.01)
*B60Q 1/26* (2006.01)

(52) U.S. Cl.
CPC ............... *F21V 31/005* (2013.01); *B60Q 1/02* (2013.01); *B60Q 1/2653* (2013.01)
USPC ........................... 362/548; 362/546; 362/549

(58) Field of Classification Search
USPC ......... 362/548, 546, 549, 496, 503, 540, 541, 362/499, 362, 368, 457, 267
See application file for complete search history.

(56) References Cited

U.S. PATENT DOCUMENTS

| 4,819,142 A | * | 4/1989 | Lothamer et al. | ............. 362/549 |
| 5,915,831 A | * | 6/1999 | Bonin et al. | .................. 362/519 |
| 7,758,222 B2 | * | 7/2010 | Malone et al. | ................ 362/546 |

FOREIGN PATENT DOCUMENTS

JP 8-183387 A 7/1996

* cited by examiner

*Primary Examiner* — Bao Q Truong
(74) *Attorney, Agent, or Firm* — Westerman, Hattori, Daniels & Adrian, LLP

(57) ABSTRACT

A vehicle lighting unit sealing structure includes a continuous sealing wall protruding from a rear surface of a housing of a rear combination tail lamp so as to surround bulb sockets supported by the housing, an engagement protrusion positioned outside the sealing wall, the engagement protrusion protruding from the rear surface of the housing so as to extend substantially parallel to the sealing wall, a sheet-like sealing member attached to an end of the sealing wall so as to cover the sealing wall, the sealing member having a slit through which the engagement protrusion extends to provide friction force between the slit and the protrusion, and a stud bolt, positioned inside the sealing wall, temporarily retaining the sealing member. The sealing member is sandwiched between the sealing wall and a lighting unit attachment wall portion of a vehicle body panel to seal a space inside the sealing wall.

7 Claims, 5 Drawing Sheets

SEALING STRUCTURE FOR VEHICLE LIGHTING UNIT

CROSS REFERENCES TO RELATED APPLICATIONS

The present application claims priority under 35 U.S.C. §119 to Japanese Patent Application No. 2012-047331, filed Mar. 2, 2012, entitled "Sealing Structure for Vehicle Lighting Unit." The contents of this application are incorporated herein by reference in their entirety.

TECHNICAL FIELD

The present disclosure relates to a sealing structure for a vehicle lighting unit.

BACKGROUND

A lighting unit, such as a tail light, to be attached to a vehicle includes a frame supporting a bulb socket. A continuous or loop-shaped sealing wall protrudes from a rear surface of the frame so as to surround the bulb socket. A sheet-like sealing member is attached to an end of the sealing wall so as to cover an opening defined by the sealing wall. A bulb, serving as a light source, is connected to the bulb socket. When the lighting unit is attached to a vehicle body panel, the sealing member is sandwiched between the sealing wall and a lighting unit attachment wall portion of the vehicle body panel. Thus, sealing is achieved to prevent, for example, water from entering a space inside the sealing wall. The sealing member and the vehicle body panel each have a bulb socket hole for preventing interference with the bulb socket (refer to Japanese Unexamined Patent Application Publication No. 8-183387, for example).

Before attachment of the lighting unit to the vehicle body panel, the sealing member is temporarily fixed to the frame and the sealing member is in contact with the whole of the end of the sealing wall. The sealing member is not securely fastened to the end of the sealing wall. Temporarily fixed points of the sealing member are positioned inside the sealing wall. Unfortunately, end part of the sealing member may be partly turned when the lighting unit is attached to the vehicle body panel. If the lighting unit is attached to the vehicle body panel while the sealing member is partly turned, the sealing member will fail to cover part of the end of the sealing wall, thus leading to incomplete sealing. Water may enter the space inside the sealing wall through that part.

According to a related-art approach to preventing such turn, a pointed pin (hereinafter, referred to as an "anti-turn pin") is provided inside the sealing wall so as to rise from the rear surface of the frame such that the pin is to be positioned in the vicinity of part of the sealing member which tends to be turned. To temporarily fix the sealing member to the frame, the tip of the anti-turn pin pierces through the sealing member to make the sealing member difficult to turn.

According to another approach, the end of the sealing wall to be positioned in the vicinity of part of the sealing member which tends to be turned is covered with a double-faced tape. The end of the sealing wall is partly bonded to the sealing member with the double-faced tape to make the sealing member difficult to turn.

In the case where the tip of the anti-turn pin pierces through the sealing member to make the sealing member difficult to turn, the tip of the anti-turn pin projects through the sealing member. It is necessary to form a hole in the lighting unit attachment wall portion of the vehicle body panel in order to prevent the tip of the anti-turn pin from interfering with the lighting unit attachment wall portion of the vehicle body panel. Disadvantageously, the cost is increased because the step of hole formation is additionally performed. To use the bulb socket hole in the lighting unit attachment wall portion as a hole to prevent interference with the anti-turn pin, the bulb socket hole has to be increased so as to cover the position of the anti-turn pin, so that the bulb socket hole has an increased area. Unfortunately, this results in a reduction in stiffness of the vehicle body panel.

In the case where the end of the sealing wall is partly bonded to the sealing member with the double-faced tape in order to make the sealing member difficult to turn, the cost is increased because the double-faced tape is additionally used. Furthermore, this case requires an additional troublesome task.

SUMMARY

The present application describes a simple and low-cost sealing structure for a vehicle lighting unit, the sealing structure being capable of reliably preventing a sealing member from being turned.

According to an aspect, a vehicle lighting unit sealing structure includes a sealing wall (for example, a sealing wall 16 in an embodiment which will be described later) that extends from a rear surface (for example, a rear surface 9 in the embodiment) of a frame (for example, a housing 6 in the embodiment) of a lighting unit (for example, a rear combination tail lamp 3 in the embodiment), the sealing member being continuous so as to surround a bulb socket (for example, bulb sockets 11 to 14 in the embodiment) supported by the frame, at least one engagement protrusion (for example, an engagement protrusion 20 in the embodiment) positioned outside the sealing wall, the engagement protrusion extending from the rear surface of the frame of the lighting unit so as to extend substantially parallel to the sealing wall, a sheet-like sealing member (for example, a sealing member 8 in the embodiment) attached to an end (for example, an end surface 16a in the embodiment) of the sealing wall so as to cover the sealing wall, the sealing member having an engagement hole (for example, a slit 36 in the embodiment) through which the engagement protrusion extends to provide friction force between the engagement hole and the engagement protrusion, and a temporary fixing member (for example, a mount 15 and a stud bolt 17 in the embodiment) positioned inside the sealing wall, the temporary fixing member temporarily retaining the sealing member. The sealing member is sandwiched between the sealing wall and a lighting unit attachment wall portion (for example, a mounting surface 41 in the embodiment) of a vehicle body panel (for example, a rear outer panel 1 in the embodiment) to seal a space inside the sealing wall.

Since the engagement protrusion and the engagement hole are positioned outside the sealing wall, the engagement protrusion does not interfere with another part inside the sealing wall. It is therefore unnecessary to form a hole for preventing interference with the engagement protrusion in the lighting unit attachment wall portion of the vehicle body panel. Furthermore, it is unnecessary to increase a hole in the lighting unit attachment wall portion. If an end of the engagement protrusion projects through the sealing member, the end of the engagement protrusion can be easily prevented from interfering with the vehicle body panel because the engagement protrusion is located outside the sealing wall.

The engagement protrusion extends substantially parallel to the sealing wall. Accordingly, upon molding of the frame using a die, the frame can be easily released. The die is permitted to have a simple structure. Thus, the cost of manufacturing can be reduced.

In this aspect, the engagement protrusion may have an elongated shape when viewed from the front direction opposite to a direction in which the engagement protrusion extends. The engagement hole may be a slit (for example, a slit 36 in the embodiment).

Accordingly, a large area can be provided as the area of contact between the engagement protrusion of the frame and the slit of the sealing member, the contact being established while the engagement protrusion extends through the slit. In addition, a large friction force can be provided between the engagement protrusion and the slit. When the sealing member is being turned, an inner surface of the slit provides resistance to the engagement protrusion. Consequently, the engagement protrusion is made difficult to separate from the slit, so that the sealing member is made more difficult to turn.

In this aspect, the at least one engagement protrusion may include a plurality of engagement protrusions arranged next to and parallel to each other.

Since the sealing member can be sandwiched between the engagement protrusions, the engagement protrusions can be made more difficult to separate from the slits. Accordingly, the sealing member can be made more difficult to turn.

In this aspect, the sealing structure may further include a positioning pin (for example, a positioning pin 21 in the embodiment) located near the engagement protrusion, the positioning pin extending from the rear surface of the frame so as to extend substantially parallel to the sealing wall. The sealing member may have a positioning hole (for example, a positioning hole 37 in the embodiment) through which the positioning pin extends.

Accordingly, the engagement protrusion can be easily inserted into the engagement hole. In the above explanation, specific elements of the embodiment with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

A vehicle lighting unit sealing structure according to an embodiment will be described below with reference to FIGS. 1 to 5.

Figure 1:
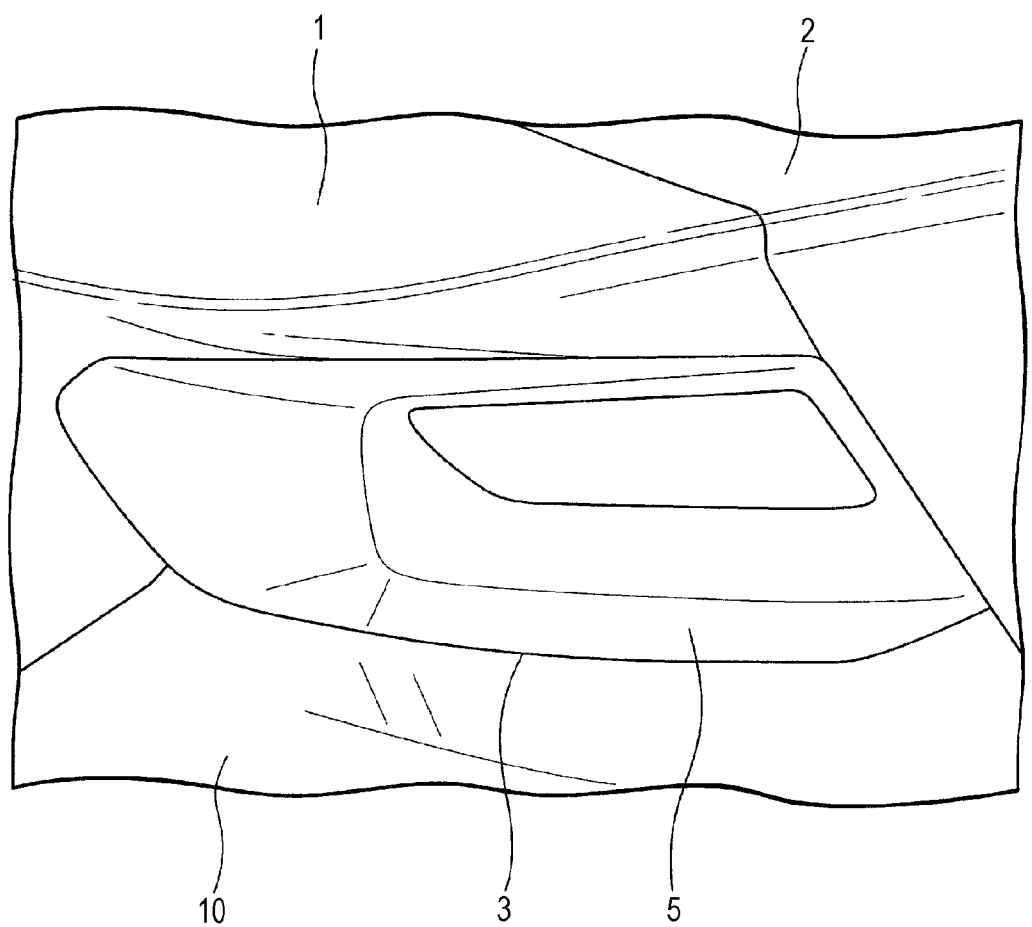
FIG. 1 is a perspective view of part of a vehicle having a rear combination tail lamp, to which a vehicle lighting unit sealing structure according to an embodiment is applied, when viewed from the rear.

FIG. 1 is a perspective view of left rear part of a vehicle. FIG. 1 illustrates a rear outer panel 1 (vehicle body panel) of a vehicle body, a trunk lid 2, a rear combination tail lamp 3 which serves as a lighting unit, and a rear bumper 10.

Figure 2:
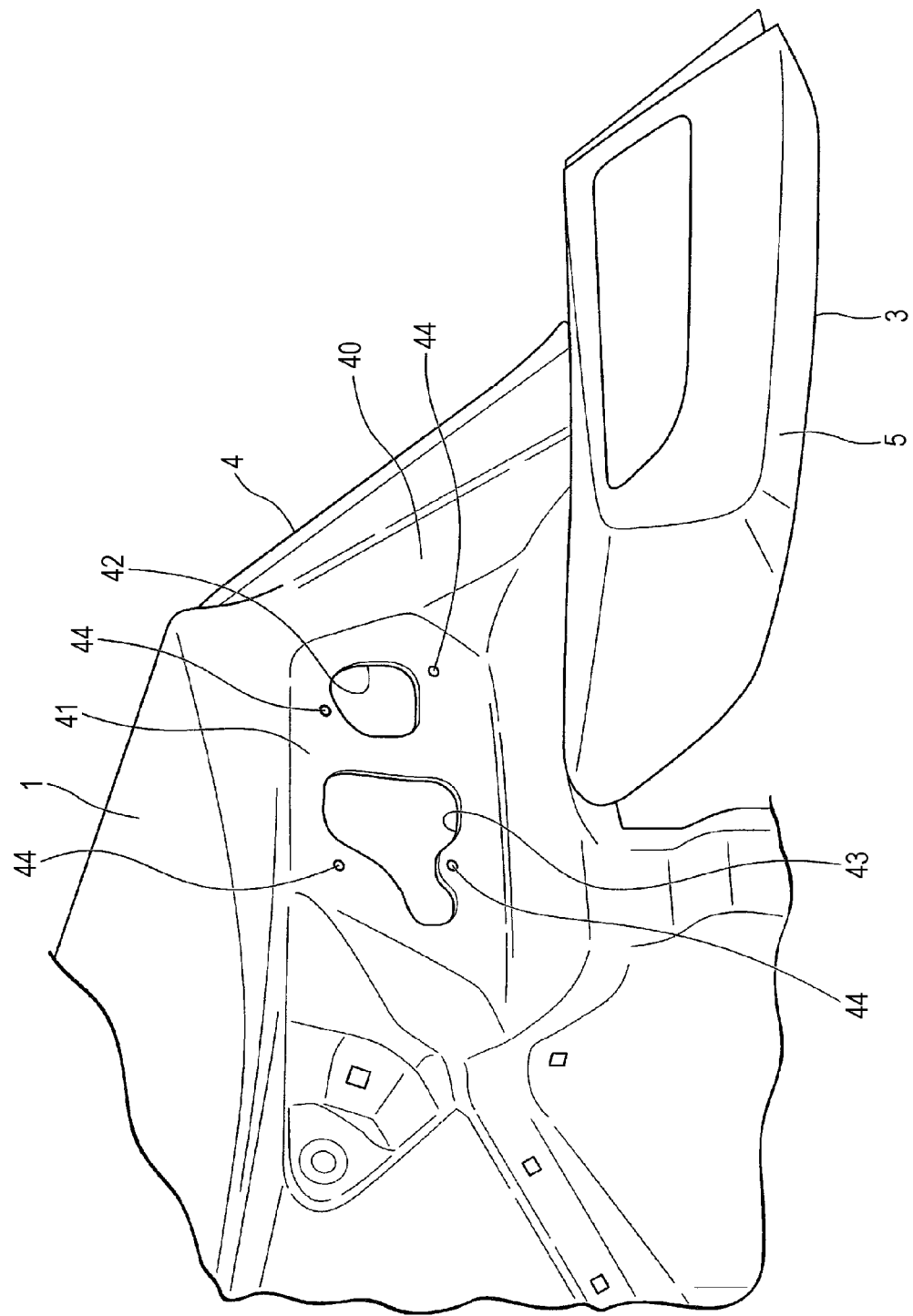
FIG. 2 is an exploded perspective view illustrating a vehicle body panel and the rear combination tail lamp prior to attachment of the rear combination tail lamp.

FIG. 2 is an exploded perspective view illustrating the rear outer panel 1 and the rear combination tail lamp 3 prior to attachment of the trunk lid 2 and the rear bumper 10. In FIG. 2, a trunk opening 4 to be closed by the trunk lid 2 is illustrated.

The rear combination tail lamp 3 is elongated along the width of a vehicle. The rear combination tail lamp 3 includes a plastic lens 5, serving as an outer surface of the rear combination tail lamp 3, and a plastic housing 6 (refer to FIGS. 3 and 4). The lens 5 is positioned at the front surface side of the lamp 3 (facing the rear direction of a vehicle body) and the housing 6 is positioned at the back surface side of the lamp 3 (facing the front direction of the vehicle body).

Figure 3:
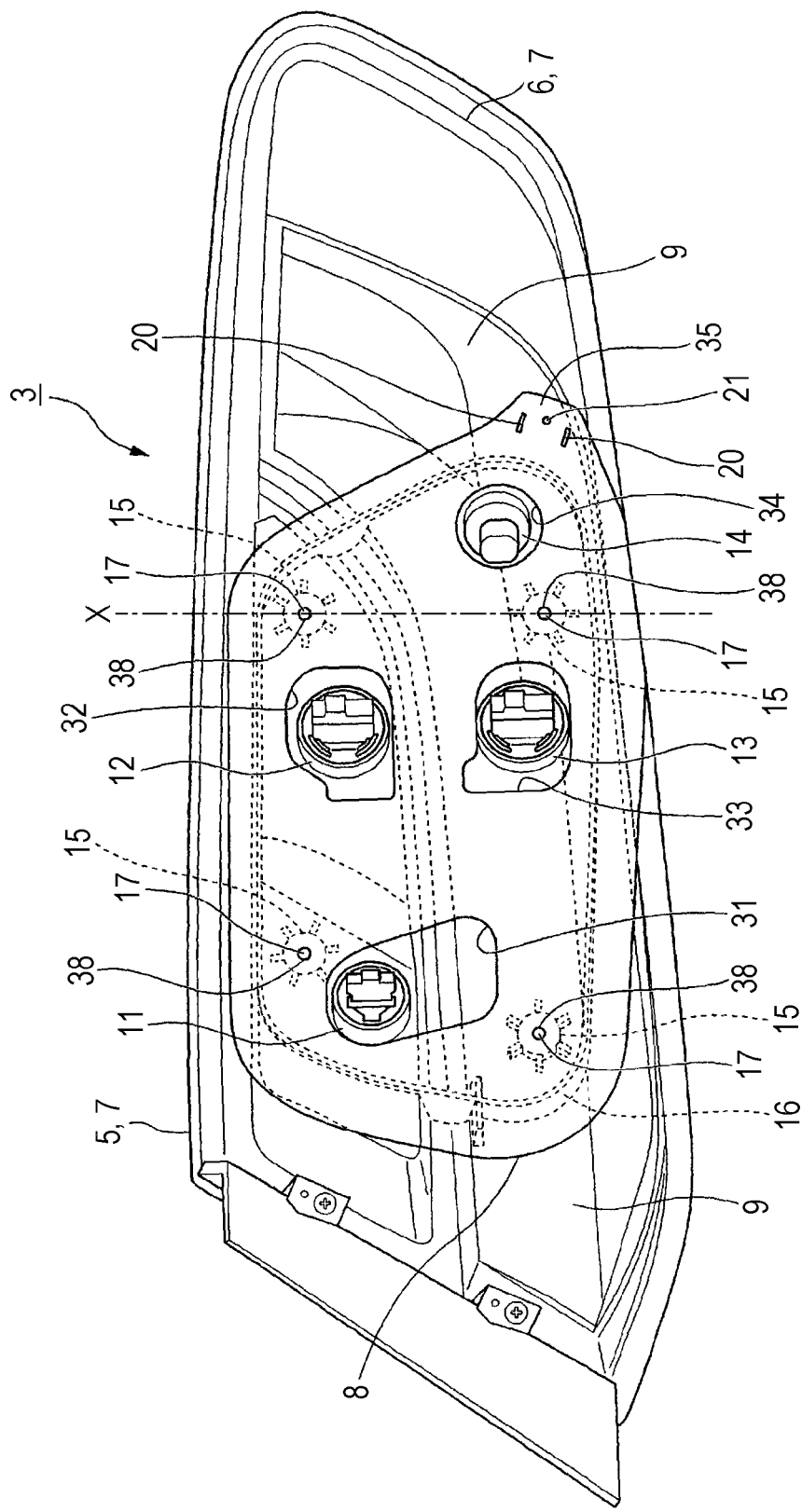
FIG. 3 is a rear view of the rear combination tail lamp.

FIG. 3 is a rear view of the rear combination tail lamp 3 when viewed from the housing 6 side. The housing 6 is integrally attached to the lens 5 by a suitable member such that an outer periphery of the housing 6 is fitted into an inner periphery of the lens 5. In this embodiment, the lens 5 and the housing 6 constitute a frame 7 of the rear combination tail lamp 3.

A reflector (not illustrated) is disposed between the lens 5 and the housing 6. A space between the lens 5 and the reflector serves as a lighting unit chamber (not illustrated).

Figure 4:
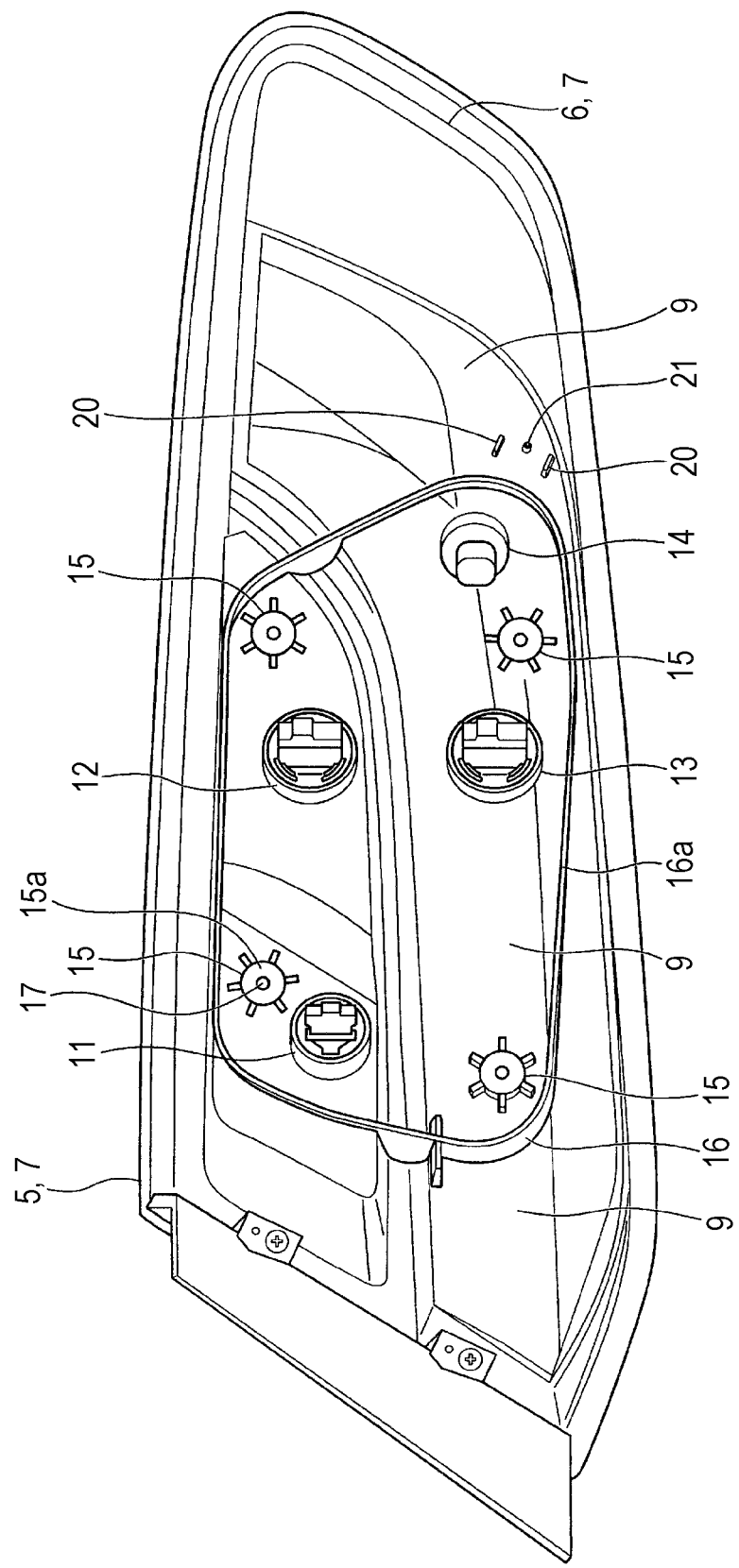
FIG. 4 is a rear view of the rear combination tail lamp prior to attachment of a sealing member.

A sheet-like sealing member 8 is attached on the rear side of the housing 6 (the side facing toward the front of the vehicle body). FIG. 4 is a rear view of the rear combination tail lamp 3 prior to attachment of the sealing member 8 to the rear combination tail lamp 3.

Referring to FIG. 4, four bulb sockets 11, 12, 13, and 14 are supported by the housing 6. The bulb socket 11 is used for a tail light, the bulb socket 12 is used for a direction indicator light, the bulb socket 13 is used for a brake light, and the bulb socket 14 is used for a side marker light.

As illustrated in FIG. 4, when the housing 6 is viewed from a rear surface 9 side, the bulb socket 11 for the tail light is positioned in upper left part of the housing 6, the bulb socket 12 for the direction indicator light is positioned to the right of the bulb socket 11 such that the bulb socket 12 is in upper middle part of the housing 6, the bulb socket 13 for the brake light is positioned under the bulb socket 12 such that the bulb socket 13 is in lower middle part of the housing 6, and the bulb socket 14 for the side marker light is positioned to the right of the bulb socket 13 such that the bulb socket 14 is in lower right part of the housing 6.

Rear part, serving as a connector, of each of the bulb sockets 11 to 14 projects from the rear surface 9 of the housing 6 backwardly (toward the front of the vehicle body). Front part, which is to be connected to a bulb, of each of the bulb sockets 11 to 14 projects from the housing 6 forwardly (toward the rear of the vehicle body) so as to face toward the lighting unit chamber. Bulbs (not illustrated), each serving as a light source, are connected to the front parts of the bulb sockets 11 to 14. The bulbs project into the lighting unit chamber.

Four mounts 15 for fastening the sealing member extend from the rear surface 9 of the housing 6 backwardly (toward the front of the vehicle body). A stud bolt 17 protrudes from an end surface 15a of each mount 15. As illustrated in FIG. 4, when the housing 6 is viewed from the rear surface 9 side, one of the mounts 15 is at the upper right of the bulb socket 11, another one of them is at the lower left of the bulb socket 11, another one of them is at the upper right of the bulb socket 12, and the other one is between the bulb sockets 13 and 14.

In addition, a continuous or loop-shaped sealing wall 16 extends from the rear surface 9 of the housing 6 backwardly (toward the front of the vehicle body) so as to surround the four bulb sockets 11 to 14 and the four mounts 15. An end surface (end) 16a of the sealing wall 16 is substantially at the same level as the end surfaces 15a of the mounts 15.

Referring to FIG. 4, a pair of upper and lower engagement protrusions 20 and a positioning pin 21 are arranged at the lower right of the bulb socket 14 outside the sealing wall 16 such that the engagement protrusions 20 and the pin 21 extend from the rear surface 9 of the housing 6 backwardly (toward the front of the vehicle body). In other words, the sealing wall 16, the engagement protrusions 20, and the positioning pin 21 protrude in the same direction.

As illustrated in FIG. 4, the engagement protrusions 20 have an elongated shape which is long in a lateral direction (i.e., along the width of the vehicle) and is short in an up-down direction when viewed from the front direction opposite to a direction in which the engagement protrusions 20 extend. The engagement protrusions 20 are arranged such that the longitudinal direction of the engagement protrusions 20 is substantially orthogonal to a side surface of the sealing wall 16. The two engagement protrusions 20 are arranged next to and parallel to each other at a predetermined distance from each other.

The positioning pin 21 is placed between the two engagement protrusions 20 such that the pin 21 is substantially equidistant from the engagement protrusions 20. The positioning pin 21 has a rounded or dome-shaped end.

The end of the positioning pin 21 is positioned at the same level as or slightly higher than ends of the engagement protrusions 20. Furthermore, the ends of the engagement protrusions 20 and the end of the positioning pin 21 are lower than the end of the sealing wall 16 by a predetermined distance. In other words, the end of the sealing wall 16 protrudes beyond the ends of the engagement protrusions 20 and the end of the positioning pin 21 in a direction away from the rear surface 9 of the housing 6 (toward the front of the vehicle body).

Referring to FIG. 3, the sealing member 8 is attached so as to cover the end surface 16a of the sealing wall 16. The sealing member 8 is made of, for example, natural rubber sponge. The sealing member 8 has a larger circumference than the end surface 16a of the sealing wall 16 such that an outer edge of the sealing member 8 outwardly extends beyond the sealing wall 16. Specifically, the sealing member 8 has an area enough to fully cover the whole of the sealing wall 16.

The sealing member 8 has bulb socket holes 31 to 34 for preventing interference with the bulb sockets 11 to 14 such that the holes 31 to 34 are arranged in one-to-one correspondence to the bulb sockets 11 to 14. Specifically, the bulb socket 11 can extend through the bulb socket hole 31, the bulb socket 12 can extend through the bulb socket hole 32, the bulb socket 13 can extend through the bulb socket hole 33, and the bulb socket 14 can extend through the bulb socket hole 34.

The sealing member 8 further has four bolt holes 38 through which the stud bolts 17 arranged on the mounts 15 of the housing 6 extend. Each bolt hole 38 has an inside diameter such that the stud bolt 17 can extend through the bolt hole 38 with no clearance. The bolt holes 38 are arranged at positions corresponding to the stud bolts 17 when the sealing member 8 is disposed in an appropriate position on the sealing wall 16.

The sealing member 8 further has an extension 35 such that the extension 35 is positioned at the lower right of the bulb socket hole 34 in FIG. 3. The distance between an outer edge of the extension 35 and the sealing wall 16 is set longer than that between an outer edge of other part of the sealing member 8 and the sealing wall 16.

Figure 5:
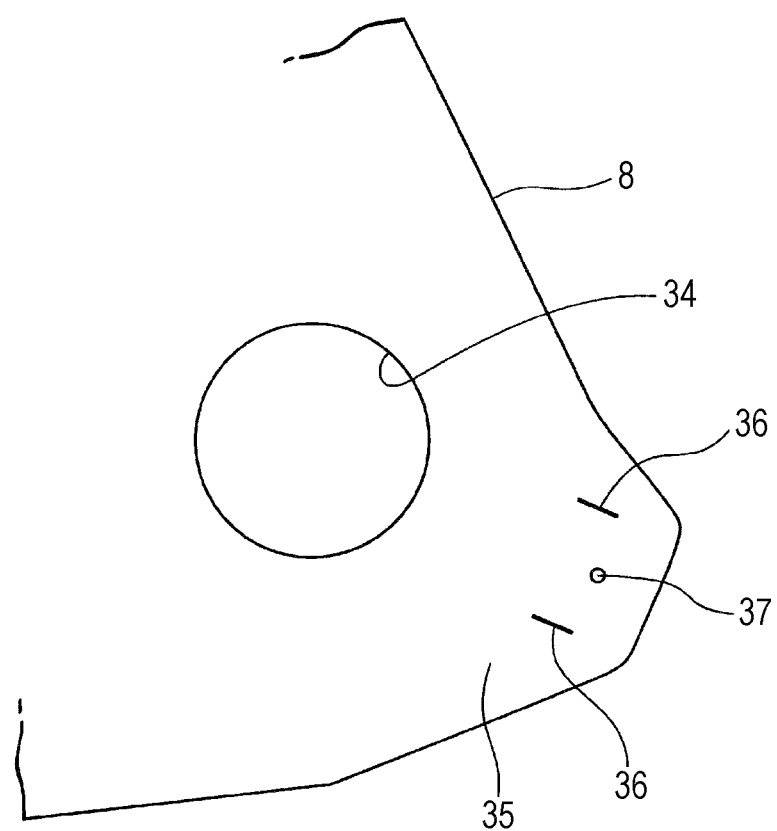
FIG. 5 is an enlarged plan view of part of the sealing member.

Referring to FIG. 5, a pair of slits (engagement holes) 36 and a positioning hole 37 are arranged in the extension 35. The slits 36 are arranged parallel to each other at a predetermined distance. The positioning hole 37 is positioned between the two slits 36 and is equidistant from the slits 36. The two slits 36 are arranged at positions corresponding to the two engagement protrusions 20 when the sealing member 8 is placed at the appropriate position on the sealing wall 16. The slits 36 are shaped such that the longitudinal direction of the slits 36 coincides with that of the engagement protrusions 20.

The positioning hole 37 is located at a position corresponding to the positioning pin 21 when the sealing member 8 is placed at the appropriate position on the sealing wall 16. The positioning hole 37 has an inside diameter equivalent to or slightly larger than an outer diameter of the end of the positioning pin 21, such that the positioning pin 21 can be easily inserted into the positioning hole 37.

As illustrated in FIG. 2, the rear outer panel 1 has a recess 40 for receiving the rear combination tail lamp 3. The recess 40 has a mounting surface (lighting unit attachment wall portion) 41, serving as a flat face, for receiving the end surface 16a of the sealing wall 16 in the housing 6 of the rear combination tail lamp 3.

The mounting surface 41 has two bulb socket holes 42 and 43 for preventing interference with the bulb sockets 11 to 14 of the rear combination tail lamp 3. In FIG. 2, the bulb socket 11 can extend through the bulb socket hole 42 (on the right side) and the three bulb sockets 12 to 14 can extend through the bulb socket hole 43 (on the left side).

In addition, the mounting surface 41 has four bolt holes 44 in total such that two of the bolt holes 44 are arranged above and below the bulb socket hole 42 and the other two of them are arranged above and below the bulb socket hole 43. The bolt holes 44 permit the four stud bolts 17 of the rear combination tail lamp 3 to extend therethrough and are arranged at positions corresponding to the stud bolts 17 when the rear combination tail lamp 3 is placed at the appropriate position.

A procedure of attachment of the rear combination tail lamp 3 will be described below.

The sealing member 8 is temporarily fixed onto the sealing wall 16 of the housing 6 of the rear combination tail lamp 3. Specifically, the bulb sockets 11 to 14 are inserted into the bulb socket holes 31 to 34 of the sealing member 8, respectively, the stud bolts 17 are inserted into the four bolt holes 38, and the sealing member 8 is come into contact with the end surface 16a of the sealing wall 16 and the end surfaces 15a of the mounts 15. At this time, the sealing member 8 is temporarily fixed to the housing 6 by the stud bolts 17.

Subsequently, while the extension 35 of the sealing member 8 is pressed downward to the rear surface 9 of the housing 6, the end of the positioning pin 21 is inserted into the positioning hole 37 of the sealing member 8, thus positioning the extension 35. After that, the extension 35 is further pressed downward, so that the engagement protrusions 20 are inserted into the slits 36 of the sealing member 8. Consequently, the ends of the engagement protrusions 20 extend through the slits 36 while being pressed into the slits 36 so as to spread the slits 36. Since each slit 36 tends to contract, an inner surface of the slit 20 is pressed in contact with an outer surface of the corresponding engagement protrusion 20, so that friction force is produced. Consequently, the extension 35 of the sealing member 8 is securely fastened to the housing 6.

When the extension 35 of the sealing member 8 is being turned away from the rear surface 9 of the housing 6, the friction force is produced between the outer surface of each engagement protrusion 20 and the inner surface of the corresponding slit 36, and the inner surface of the slit 36 provides resistance to the outer surface of the engagement protrusion 20. Thus, the extension 35 is made very difficult to turn.

The rear combination tail lamp 3 in which the sealing member 8 is temporarily fixed to the housing 6 in the above-described manner is placed in the recess 40 of the rear outer panel 1. In this case, the bulb socket 11 of the rear combination tail lamp 3 is inserted into the bulb socket hole 42 of the rear outer panel 1, the bulb sockets 12 to 14 are inserted into the bulb socket hole 43 of the rear outer panel 1, and the four stud bolts 17 of the rear combination tail lamp 3 are inserted into the bolt holes 44 of the rear outer panel 1.

A nut (not illustrated) is screwed onto each stud bolt 17 extending through the corresponding bolt hole 44 of the rear outer panel 1 and is tightened. Thus, the rear combination tail lamp 3 and the sealing member 8 can be fastened to the rear outer panel 1 while the sealing member 8 is disposed between the mounting surface 41 of the rear outer panel 1 and the housing 6 of the rear combination tail lamp 3. Furthermore, the sealing member 8 can be pressed in contact with the mounting surface 41 of the rear outer panel 1 by the end surface 16a of the sealing wall 16 of the housing 6. Thus, a space inside the sealing wall 16 can be sealed to prevent, for example, water from entering the space.

It is assumed that the engagement protrusions 20 and the positioning pin 21 are eliminated from the housing 6 and the slits 36 and the positioning hole 37 are eliminated from the sealing member 8. In such a case, when the rear combination tail lamp 3 is placed in the recess 40 of the rear outer panel 1, part of the sealing member 8 located on the right side of a virtual line X connecting the two stud bolts 17 arranged on the right in FIG. 3 tends to be turned away from the rear surface 9 of the housing 6, because this part is free and is located away from points where the sealing member 8 is temporarily fixed by the stud bolts 17. Accordingly, if an operator places the rear combination tail lamp 3 in the recess 40 of the rear outer panel 1 without being aware of the turned part of the sealing member 8, a gap may be formed between the mounting surface 41 of the rear outer panel 1 and the end surface 16a of the sealing wall 16 in the turned part of the sealing member 8, thus leading to poor sealing.

According to this embodiment, however, in the rear combination tail lamp 3, the housing 6 has the engagement protrusions 20 and the sealing member 8 has the slits 36 in the extension 35 such that the engagement protrusions 20 are inserted into and fastened to the slits 36 as described above. Accordingly, the extension 35 is made very difficult to turn. This prevents installation of the rear combination tail lamp 3 into the recess 40 of the rear outer panel 1 while the extension 35 of the sealing member 8 is being turned. Consequently, the interface between the mounting surface 41 of the rear outer panel 1 and the end surface 16a of the sealing wall 16 can be reliably sealed.

Since the engagement protrusions 20 and the positioning pin 21 are arranged outside the sealing wall 16, these parts do not interfere with other parts located inside the sealing wall 16, for example, the sealing member 8 in an area inside the sealing wall 16 and the mounting surface 41 of the rear outer panel 1. It is therefore unnecessary to form holes for preventing interference with the engagement protrusions 20 and the positioning pin 21 in the sealing member 8 and the mounting surface 41 of the rear outer panel 1. Thus, a step of forming these holes is not needed, so that the process of manufacturing can be simplified and the cost of manufacturing can be reduced. Furthermore, the engagement protrusions 20 and the positioning pin 21 can be molded simultaneously with manufacturing of the housing 6. Thus, a new processing step is not added. Additionally, since the slits 36 and the positioning hole 37 can be formed simultaneously with press cutting of the sealing member 8, a new processing step is not added.

Although the ends of the engagement protrusions 20 project through the sealing member 8, the ends of the engagement protrusions 20 can be easily prevented from interfering with the rear outer panel 1 because the engagement protrusions 20 are located outside the sealing wall 16. In particular, since the ends of the engagement protrusions 20 and the end of the positioning pin 21 are lower than the end of the sealing wall 16 by the predetermined distance in this embodiment, the engagement protrusions 20 can be reliably prevented from interfering with the mounting surface 41 of the rear outer panel 1.

The sealing wall 16, the engagement protrusions 20, and the positioning pin 21 protrude in the same direction. Upon molding of the housing 6 using a die, therefore, the housing 6 can be easily released. Accordingly, the die is permitted to have a simple structure, thus reducing the manufacturing cost.

The engagement protrusions 20 have an elongated shape when viewed from the front direction opposite to the extending direction of the engagement protrusions 20. Accordingly, a large area can be provided as the area of contact between each engagement protrusion 20 and the corresponding slit 36 of the sealing member 8 when the engagement protrusion 20 is inserted into the slit 36. In addition, a large friction force can be provided between the engagement protrusion 20 and the slit 36. As described above, when the sealing member 8 is being turned, the inner surface of each slit 36 provides resistance to the corresponding engagement protrusion 20. Consequently, the engagement protrusion 20 is made difficult to separate from the slit 36, so that the sealing member 8 is made more difficult to turn.

Since the two engagement protrusions 20 are arranged parallel to each other, the sealing member 8 can be sandwiched between the pair of engagement protrusions 20. Consequently, the engagement protrusions 20 are made more difficult to separate from the slits 36. Accordingly, the sealing member 8 can be made more difficult to turn.

Since the positioning pin 21 is disposed near the engagement protrusions 20 and the sealing member 8 has the positioning hole 37 which the positioning pin 21 can be inserted into, the engagement protrusions 20 can be easily inserted into the slits 36.

The present disclosure is not limited to the above-described embodiment.

For example, the position of the engagement protrusions is not limited to the above descriptions. The engagement protrusions may be arranged in a plurality of positions. In this case, a plurality of positioning pins may also be arranged in a plurality of positions. The engagement holes are not limited to slits. Other shape or form may be used.

The lighting unit is not limited to the rear combination tail lamp. The embodiment may be applied to, for example, a headlight.

I claim:

1. A sealing structure for a vehicle lighting unit, comprising:
a sealing wall protruding from a rear surface of a frame of the lighting unit, the sealing wall extending continuously so as to surround a bulb socket supported by the frame;
a sheet-like sealing member disposed on an end of the sealing wall so as to cover the end of the sealing wall, wherein the sealing member is sandwiched between the sealing wall and a lighting unit attachment wall portion of a vehicle body panel to seal a space inside the sealing wall;

a temporary fixing member positioned inside the sealing wall, the temporary fixing member temporarily retaining the sealing member; and at least one engagement protrusion positioned outside the sealing wall, the engagement protrusion protruding from the rear surface of the frame of the lighting unit, wherein the sealing member includes an engagement hole receiving the engagement protrusion to provide friction force between the engagement hole and the engagement protrusion.

2. The sealing structure according to claim 1, wherein the engagement protrusion includes an elongated shape in transverse section thereof, and wherein the engagement hole is a slit.

3. The sealing structure according to claim 2, comprising a plurality of the engagement protrusions arranged adjacent to and parallel to each other.

4. The sealing structure according to claim 1, further comprising a positioning pin located near the engagement protrusion and protruding from the rear surface of the frame, wherein the sealing member includes a positioning hole receiving the positioning pin.

5. The sealing structure according to claim 1, wherein the engagement protrusion protrudes substantially parallel to the sealing wall.

6. The sealing structure according to claim 4, wherein the engagement protrusion and the positioning pin protrude substantially parallel to the sealing wall.

7. The sealing structure according to claim 1, wherein the height of the engagement protrusion is lower than the sealing wall.

* * * * *